APPARATUS FOR HOLDING THE RECORD ON THE TURNTABLE OF A PORTABLE PHONOGRAPH

Filed June 5, 1964

INVENTORS
WARREN M. MINER
AKIRA A. YAMASAKI
BY
ATTORNEY

INVENTORS
WARREN M. MINER
AKIRA A. YAMASAKI
BY Raymond Wootton
ATTORNEY

Aug. 29, 1967 W. M. MINER ETAL 3,338,581

APPARATUS FOR HOLDING THE RECORD ON THE TURNTABLE OF A PORTABLE PHONOGRAPH

Filed June 5, 1964 4 Sheets-Sheet 3

INVENTORS
WARREN M. MINER
AKIRA A. YAMASAKI
BY
Raymond Wootton
ATTORNEY

FIG. 6
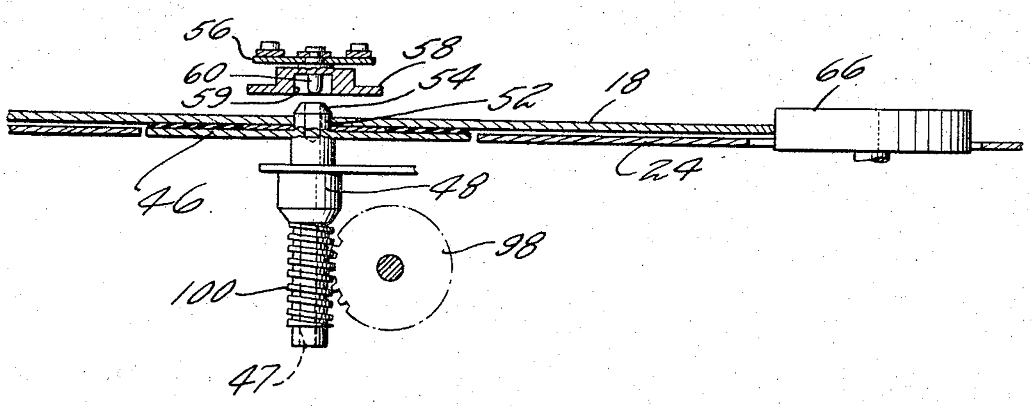
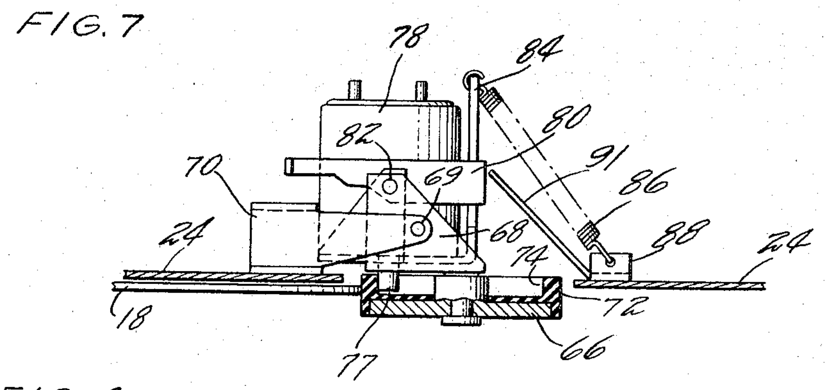
FIG. 8
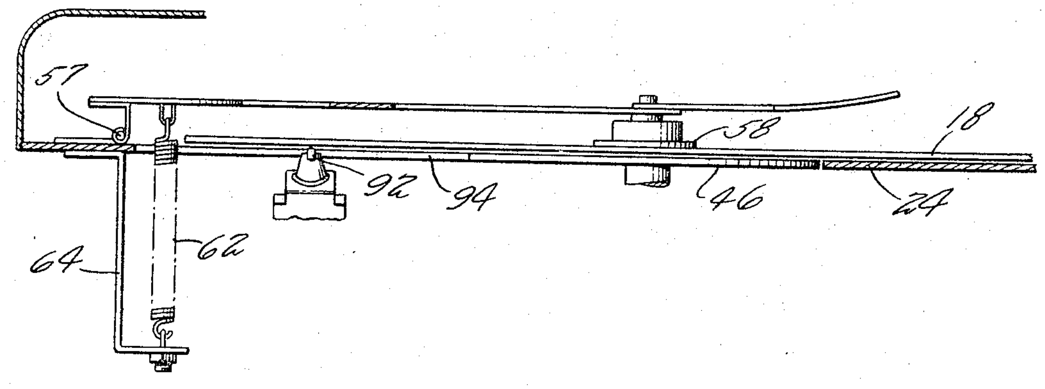
INVENTORS
WARREN M. MINER
AKIRA A. YAMASAKI
BY Raymond W. Colton
ATTORNEY United States Patent Office 3,338,581
Patented Aug. 29, 1967

3,338,581

APPARATUS FOR HOLDING THE RECORD ON THE TURNTABLE OF A PORTABLE PHONOGRAPH

Warren M. Miner, Brooklyn, and Akira A. Yamasaki, Tappan, N.Y., assignors to The Solocast Company, a corporation of Connecticut Filed June 5, 1964, Ser. No. 372,816
5 Claims. (Cl. 274—39)

This invention relates to a record player, and particularly to a novel hold-down disc for the record for use particularly in portable record players intended to play while being carried.

One feature of the invention is a hold-down disc located on the side of the record opposite to the turntable and movably mounted for removal or replacement of a record. Another feature is a support for this disc such that it serves as an added bearing for the turntable. Another feature is a hinged mounting to support the hold-down disc.

One feature is a device of this character in combination with driving means for the record separate from the turntable, more particularly where the driving means engages the periphery of the record and thus exerts a lateral thrust on the turntable. Another feature is a hold-down disc that will serve to hold the record against the turntable in any position of the record player such that the record player will function in any position. One feature of the invention is a device in which the stylus engages the record on the same side as the turntable against the supporting action of the disc.

According to the invention, the turntable has a spindle which is journalled in a bearing located adjacent to the turntable on the side opposite to the record and a hinged arm extending over the record carries a hold-down disc that fits over the central stud on the turntable and holds the record securely in contact with the disc, the hold-down disc also serving as another bearing for the turntable on the side of the record remote from the turntable.

Other features and advantages will be apparent from the specification and claims, and from the accompanying drawings which illustrate an embodiment of the invention.

FIG. 6 is a sectional view through the turntable mechanism and record driving mechanism.

FIG. 7 is a side elevation of the driving mechanism.

FIG. 8 is a sectional view of the hold-down arm and the turntable.

Figures 1, 2:
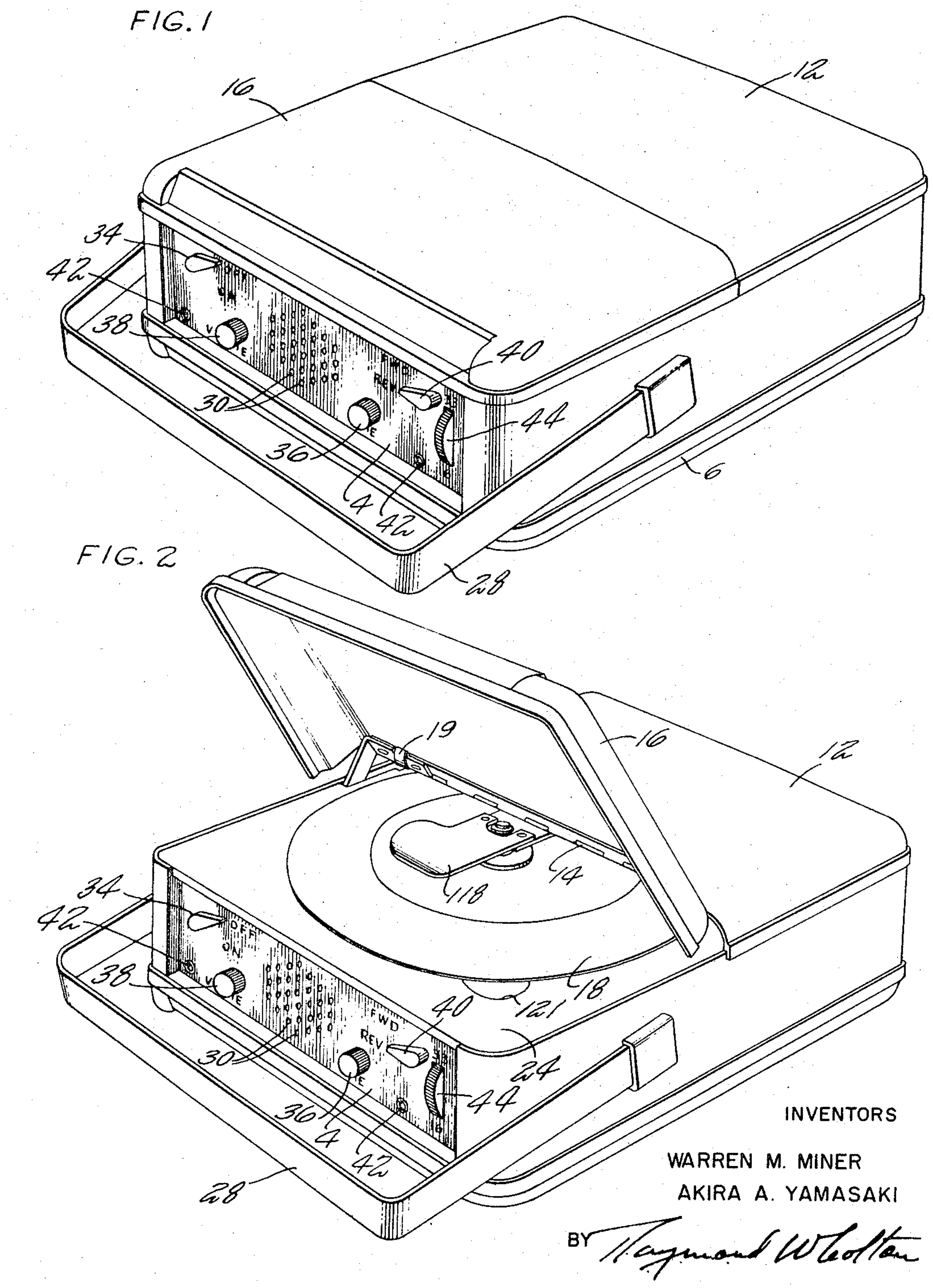
FIG. 1 is a perspective view of the device with the cover closed.
FIG. 2 is a view similar to FIG. 1 with the cover closed.

The device includes a chassis having a front panel 4 on which the external controls are mounted. A bottom cover 6 is secured to the bottom plate 8 of the chassis in spaced relation thereto.

A top cover plate 12 is attached to the chassis and is hinged as at 14 substantially midway between the front and back to provide, in effect, a movable cover 16 which is opened for the removal of and insertion of a record 18. The cover is held selectively in open or closed position by a spring 19.

Figures 3, 4:
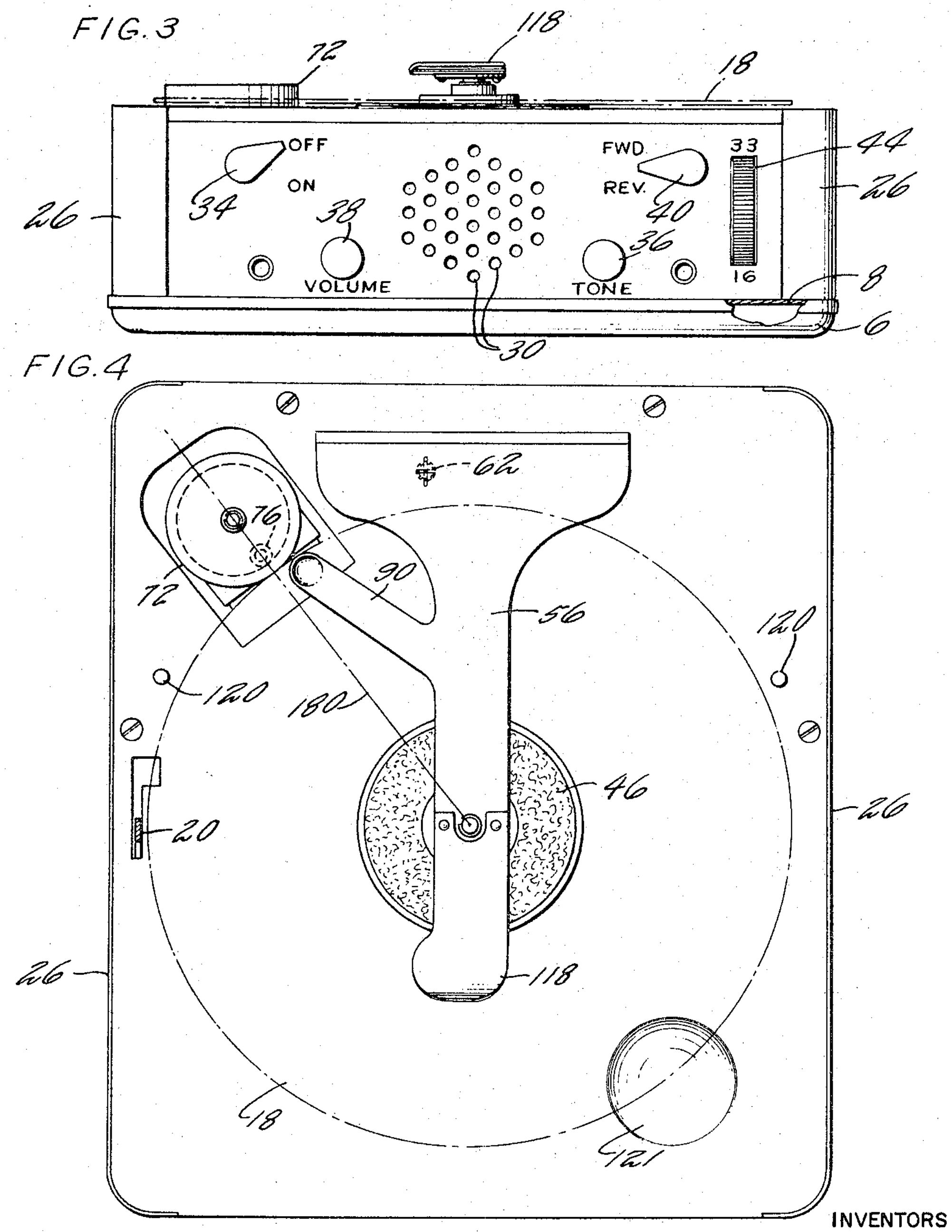
FIG. 3 is a front view of the device.
FIG. 4 is a plan view of the device with the cover removed.

The chassis includes a top plate 24 to which substantially the entire mechanism is attached and which also carries the front panel 4, as shown, for example, in FIG. 3. The chassis has side walls 26 and an end wall, not shown, which form enclosures for the mechanism.

The control panel has a centrally located grill 30 in back of which is located a loud speaker 32. The panel also carries an on-off control lever 34 and may have, as shown in FIG. 1, a tone control 36, a volume control 38, a scanning lever 40 and a speed control disc 44. A U-shaped handle 28, hinged at its ends in the side walls 26 provides a convenient means for carrying the device.

Figure 5:
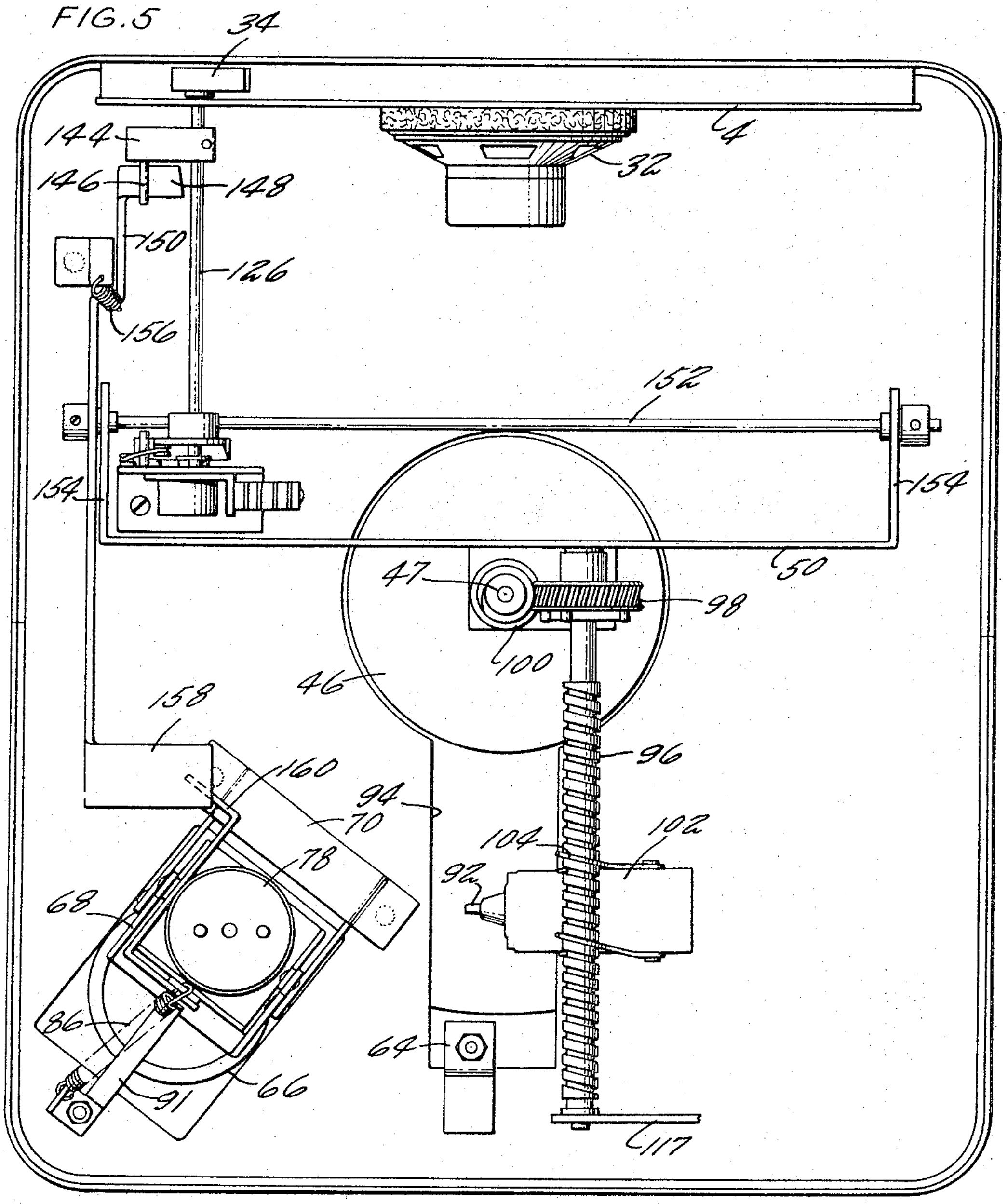
FIG. 5 is an inverted view of the chassis.

Referring now to FIGS. 6 and 8, the record 18 is supported on a turntable 46 having a shaft 47 journalled in a bearing 48 carried by a bracket 49 on the intermediate frame member 50, FIG. 5, of the chassis. The record is supported between the top plate 24 of the chassis and the top cover 12 and is held in position on the turntable by a central hollow stud or pin 52 extending centrally from the turntable. The upper end of this stud may be conical as at 54 to assist in positioning the record on the turntable. An arm 56 secured by a hinge 57 to the top plate 24 carries a hold-down disc 58 that engages the surface of the record opposite to the turntable. The hinge 57 is relatively long to provide a secure support for the arm and disc and the hinge is preferably located close to the periphery of the record, as shown in FIG. 4.

The disc has a central recess 59 to receive and form a sliding fit with the stud 52 and has a central projection 60 that fits within the hollow stud 52 thereby forming a bearing for the stud. In this way, the hinged arm 56 serves as a support for a second bearing for the turntable located on the side opposite to the bearing 48 so that the record is securely held in position within the device with no tilting of the turntable possible. The arm 56 is held in operative position with the hold-down disc engaging the record by a spring 62 extending between the underside of the arm 56 and a bracket 64, FIG. 8, on the chassis and urging the arm in a direction to hold the record securely on the turntable.

The record is driven by a driving pulley or wheel 66, FIG. 6, journalled in a bracket 68 which is pivotally supported as by pins 69 on a fixed bracket 70, the latter being attached to the top plate 24. The wheel 66 has a peripheral flange 72, the outer peripheral surface of which engages with the periphery of the record 18, as will be apparent. The inner peripheral surface 74 of the flange is engaged by a shaft 77 on a drive motor 78. The motor is mounted on a bracket 80 pivotally mounted as at 82 on the bracket 68. The pivotal mounting for the motor is parallel to and spaced from the pivotal mounting for the bracket 68 and both of these pivotal mountings are parallel to the plane of the record.

The bracket 80 has a projecting arm 84, the free end of which is connected by a spring 86 to a mounting bracket 88 attached to the top plate 24. In this way the spring 86 normally urges the shaft 77 into engagement with the driving wheel 66 and also urges the driving wheel against the periphery of the record. To prevent buckling of the record 18, the hinged arm 56 may have a projecting finger 90 which overlies the periphery of the record adjacent to the location of the driving wheel. A fixed stop 91 on the plate 24 limits the pivotal movement of the motor and wheel in a clockwise direction, FIG. 7.

The record is played through a stylus 92 which engages with the side of the record adjacent to the top plate 24, this side being opposite to the top cover 12 and on the same side of the record as the turntable. In effect, this can be considered the underside of the record and the stylus engages the record through a slot 94 in the top plate. The stylus is caused to move radially of the record as the record is rotating through a helically grooved lead screw 96, the latter being rotated by the rotation of the turntable on which the record is carried.

The lead screw 96, FIG. 5, has mounted thereon a worm gear 98 which is driven from a worm 100 on the shaft 47 for the turntable. With this arrangement the turntable will be rotated as a result of the record being driven and will provide a rotation of the lead screw 96 in proper timed relation to the rotation of the record to traverse the stylus at the appropriate rate to keep the stylus in the record groove. The particular mounting and traversing mechanism for the stylus is described and claimed in the copending application Ser. No. 372,815, filed June 5, 1964, having the same assignee as this application. It is sufficient to note that the carriage 102 for the stylus carries spring finger 104 engaging the lead screw.

The device carries a mechanism, FIG. 5, for moving the driving mechanism into and out of operative position and includes a rod 126 to which the on-off lever is attached and this rod, through a projecting arm 144 and pin 146 rocks a lever 150 on a cross rod 152 against the action of a spring 156 to lift the tab 158 on the lever 150 away from a projecting arm 160 on the bracket 80 such that the motor may pivot into driving position. The cross rod 152 is journalled in end portions 154 of the frame member 150.

With the arrangement above described the record is supported securely by the turntable and hold-down disc on opposite sides thereof, and the additional bearing provided by the disc serves to form an unusually rigid support for the turntable so that the record will be securely supported in any position of the device. The stylus, located as it is on the underside of the top plate 24, is protected from injury and engages the record on the same side as the turntable.

It is to be understood that the invention is not limited to the specific embodiment herein illustrated and described, but may be used in other ways without departure from its spirit as defined by the following claims.

We claim:

1. In a record player, a base having a bearing thereon, a turntable having a spindle journalled in said bearing, a stud located centrally on the turntable to position a record thereon, said stud containing a central opening in its end, and a hold-down disc engaging with said stud and engageable with the record on the side opposite to the turntable, said disc forming a bearing for said stud and having a central projection fitting said stud opening.

2. A record player as in claim 1 in which the end of the stud is externally conical to guide the record into position and to guide the disc into piloting engagement with the stud.

3. A record player having a base, a bearing on the base, a turntable journalled in said bearing and having a stud centrally thereon to locate a record on the turntable, a holddown disc supported by the base on the side of the record opposite to the turntable, spring means to urge the disc resiliently toward the turntable to hold a record in position thereon, record driving means mounted on said base for engagement with a peripheral portion of a record carried by said turntable, and a finger supported by said base having a surface overlying said record for engagement with a surface portion of said record adjacent said peripheral portion.

4. A record player as in claim 3 in which a stylus is positioned on the same side of the record as the turntable for engagement therewith.

5. A record player as in claim 3 in which the hold-down disc is supported by a hinged arm, and said arm carries said finger.

References Cited

UNITED STATES PATENTS

| | | | |
|---|---|---|---|
| 2,581,345 | 1/1952 | Andrews | 274—10 |
| 2,725,235 | 11/1955 | Hull | 274—10 |
| 2,735,683 | 2/1956 | Klein | 274—39 X |
| 3,034,792 | 5/1962 | Kenney | 274—39 X |

NORTON ANSHER, *Primary Examiner.*

CLIFFORD B. PRICE, *Examiner.*